United States Patent
Di Cairano et al.

(10) Patent No.: US 9,804,580 B2
(45) Date of Patent: Oct. 31, 2017

(54) FEASIBLE TRACKING CONTROL OF MACHINE

(71) Applicant: Mitsubishi Electric Research Laboratories, Inc., Cambridge, MA (US)

(72) Inventors: Stefano Di Cairano, Cambridge, MA (US); Francesco Borrelli, Kensington, MA (US)

(73) Assignee: Mitsubishi Electric Research Laboratories, Inc., Cabmbridge, MA (US)

( * ) Notice: Subject to any disclaimer, the term of this patent is extended or adjusted under 35 U.S.C. 154(b) by 966 days.

(21) Appl. No.: 14/087,220

(22) Filed: Nov. 22, 2013

(65) Prior Publication Data
US 2015/0148924 A1    May 28, 2015

(51) Int. Cl.
*G05B 17/02*    (2006.01)
*G05B 13/04*    (2006.01)

(52) U.S. Cl.
CPC .......... *G05B 17/02* (2013.01); *G05B 13/048* (2013.01); *G05B 2219/23006* (2013.01)

(58) Field of Classification Search
CPC ...... G05B 17/02; G05B 13/048; G05B 13/04; G05B 13/041; G05B 13/042; G05B 13/047; G05B 2219/23006
See application file for complete search history.

(56) References Cited

U.S. PATENT DOCUMENTS

| 7,376,472 B2 | 5/2008 | Wojsznis et al. | |
| 2009/0198350 A1* | 8/2009 | Thiele | G05B 13/042 700/30 |
| 2009/0319059 A1* | 12/2009 | Renfro | G05B 17/02 700/30 |
| 2010/0198368 A1* | 8/2010 | Mestha | G03G 15/0266 700/28 |

OTHER PUBLICATIONS

Olaru et al. "Compact explicit MPC with guarantee of feasibility for tracking," Decision and Control, 2005 and 2005 European Control Conference. CDC-E CC '05. 44th IEEE Conference On Seville, Spain Dec. 12-15, 2005. pp. 969-974.

(Continued)

*Primary Examiner* — Nathan L Laughlin
(74) *Attorney, Agent, or Firm* — Gene Vinokur; James McAleenan; Hironori Tsukamoto

(57) ABSTRACT

A method for controlling an operation of a machine determines a feasible region for states of the machine and states of the reference trajectory defined by constraints of the machine, constraints on a reference trajectory and constraints on bounds of a tracking error and selects a subset of the feasible region, such that for any state of the machine and any state of the reference trajectory within the subset, there is an admissible control maintaining the state of the machine within the subset for all admissible future states of the reference trajectory determined by the model and the constraints of the reference trajectory. Next, an admissible control action for controlling the operation of the machine is selected such that the state of the machine remains in the (Continued)

subset for all admissible future states of the reference trajectory.

16 Claims, 17 Drawing Sheets

(56) References Cited

OTHER PUBLICATIONS

Limon D et al. "MPC for tracking piecewise constant references for constrained linear systems," Automatica, Pergamon, Amsterdam, NL, vol. 44, No. 9. Sep. 1, 2008, pp. 22382-2387.

Kerrigan et al. "Invariant sets for constrained nonlinear discrete-time systems with application to feasibility in model predictive control," Proceedings of the 39th IEEE Conference on Decision and Control: Dec. 12-15, 2000, Sydney Convention and Exhibition Centre, Sydney, Australia. Jan. 1, 2001. pp. 4951-4956.

* cited by examiner

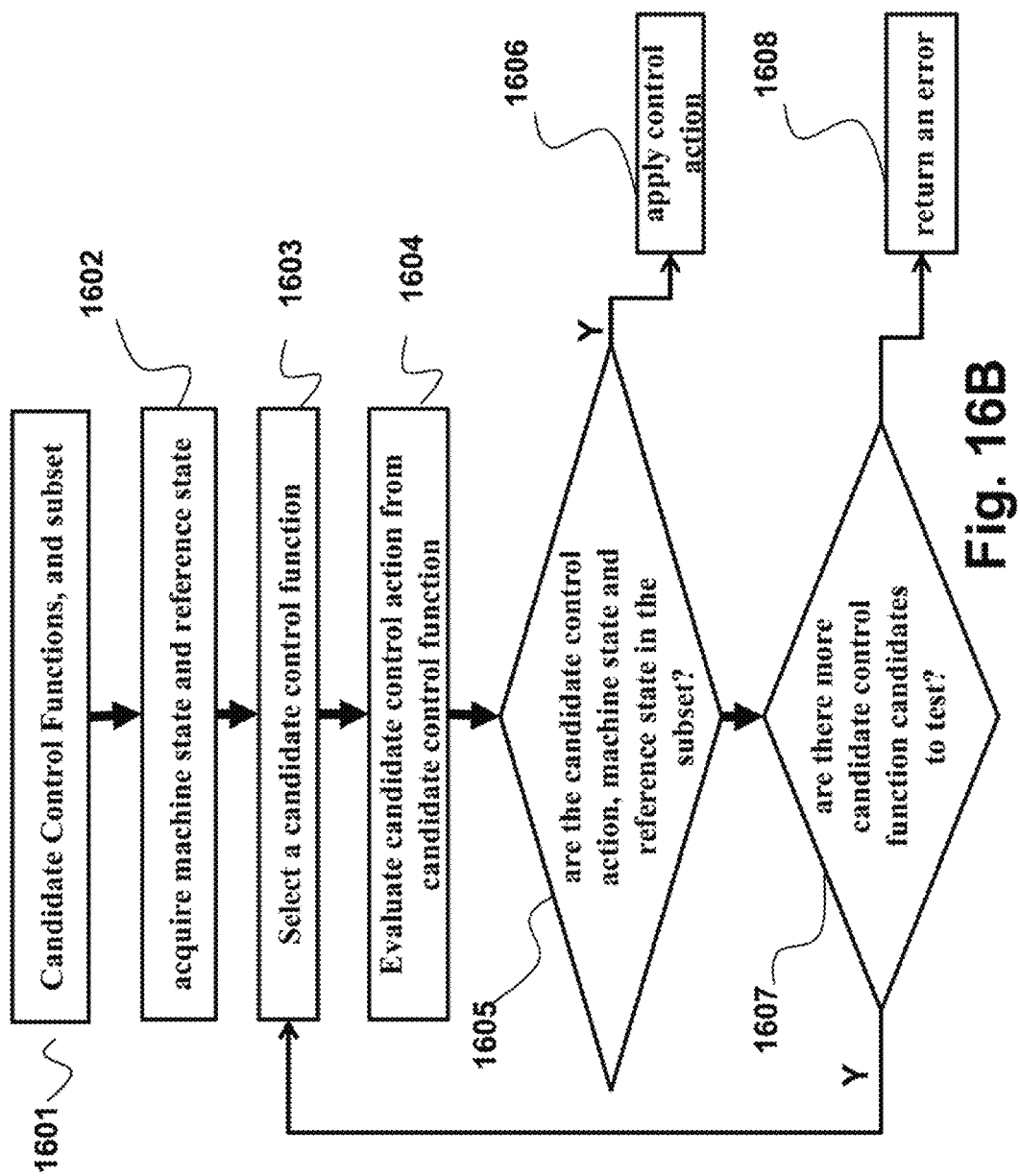

FEASIBLE TRACKING CONTROL OF MACHINE

FIELD OF THE INVENTION

The present invention relates generally to automated process control, and more particularly to optimization-based receding horizon control of a machine tracking a trajectory.

BACKGROUND OF THE INVENTION

Many advanced control techniques are formulated as optimization problems, which can be solved by mathematical programming. One class of such techniques is optimization-based receding horizon control, such as model predictive control (MPC). There are MPC formulations for both linear and nonlinear systems. Nonlinear MPC solves nonlinear mathematical programs in real-time, which can be a challenging task due to a limitation on computing resources, the complexity of the problem to solve, or the time available to solve the problem. Therefore, most of the practical applications are based on a linearity assumption or approximation. The linear MPC typically solves a quadratic programming problem.

The MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, legitimate and safety limitations on the operation of the machine, and performance limitations on a trajectory. A control strategy for the machine is admissible when the motion generated by the machine for such a control strategy satisfies all the constraints. For example, at time t the current state of the machine is sampled and an admissible cost minimizing control strategy is determined for a relatively short time horizon in the future. Specifically, an online or on-the-fly calculation determines a cost-minimizing control strategy until time t+T. Only the first step of the control strategy is implemented, then the state is sampled again and the calculations are repeated starting from the now current state, yielding a new control and new predicted state path. The prediction horizon keeps being shifted forward and for this reason MPC is also called receding horizon control.

The MPC can be used to generate the actual trajectory of the motion of the machine based on a model of the machine and the desired reference trajectory by solving an optimal control problem over a finite future time horizon subject to various physical and specification constraints of the machine. The MPC aims for minimizing performance indices of the machine motion, such as the error between the reference and the actual motion of the machine, the machine energy consumption, and the induced machine vibration.

However, due to the receding horizon and tracking nature of the problem, the MPC has no guarantee of finding an admissible solution. Specifically, the existence of the solution on a certain window of data (horizon) does not by itself guaranty that when the data window is shifted, a solution still exists. Thus, the control that is optimal for one iteration at one time period can place the machine in the state that forces the machine to violate some constraints during the next iteration, see, e.g., a method described in U.S. Pat. No. 7,376,472

To address this problem, the conventional solutions either determine the optimal trajectory off-line to allow the time to verify the trajectory, or determine a suboptimal, but feasible trajectory as an input to the optimization method, or increase a length of the finite future time horizon to reduce the uncertainty of the optimization, see, e.g., Mayne et al.: "Constrained model predictive control: Stability and optimality." Automatica, Volume 36, Issue 6, Pages 789-814, June 2000.

However, in a number of applications, it is not possible to determine the feasible trajectory off-line. In addition, the increase of the finite future time horizon makes the computation more difficult, which can prevent the computation of the control strategy to be completed in the time allowed for the MPC method. Also, for longer time horizon, the future information required to determine the feasible trajectory might not be available.

Some conventional methods guarantee admissibility with respect to certain tracking performance metrics only at the steady state operation of the controlled machine. For example, Pannocchia: "Disturbance models for offset—free model—predictive control," AIChE Journal (2003), 49(2), 426-437, Maeder et al.: "Linear offset-free model predictive control," Automatica (2009), 45(10), 2214-2222, describe control methods that guarantee tracking a reference trajectory at a steady state. Also, Ferramosca et al.: "MPC for tracking of constrained nonlinear systems," CDC/CCC 2009 and Falugi et al.: "Tracking performance of model predictive control," in Decision and Control (CDC), 2012 IEEE 51st Annual Conference on (pp. 2631-2636) describe methods that modify the reference trajectory to satisfy constraints on the machine dynamics.

All these methods fail to guarantee any performance metrics of the tracking of the trajectory during the transient phase of the operation. However, the transient response of a machine to a change from equilibrium is important for a number of applications, such as factory automation and automotive or aerospace vehicle controls. It is believed, that currently there is no method in the art that can guarantee the feasibility of tracking performance metrics of the machine tracking the trajectory in the transient stage.

SUMMARY OF THE INVENTION

It is an objective of some embodiments of the invention to provide a system and a method for controlling a constrained operation of a machine according to a reference trajectory. It is another objective to provide such a system and a method that guarantees that at any moment of the controlling there is a control input resulting in the feasible state of the machine satisfying the constraints of the operation for all possible variations of the reference trajectory. It is another objective of some embodiments to provide such a system and a method that guarantees satisfaction of the constraints during transient stage of the operation of the machine.

Various embodiments of the invention transform the tracking problem into an optimization problem subject to constraints. For example, some embodiments of the invention are based on a realization that a transient of the reference trajectory can be constrained, e.g., based on specification of the machine. Such realization allows limiting unpredictability of the transient stage of operation. In addition, the constraints on the transient of the reference trajectory can reduce the need for determining the reference trajectory in advance, which can be advantageous for some controller with limited computation capabilities. Some embodiments use only a model of the reference motion profile, but the model includes uncertainty, which represents all possible variations of the reference trajectory.

Some embodiments of the invention are based on another realization that in some applications, it is important to guarantee that the tracking error is bounded within some predefined bounds, although the tracking error needs not be zero. In those applications, the tracking of the reference trajectory can also be represented as a constraint to be satisfied.

The constraints of the machine, constraints on the transient of the reference trajectory and constraints on bounds of a tracking error form a feasible region of a state of the machine and a state of the reference trajectory. Accordingly, it is possible to optimize the control maintaining the state of the machine and the state of the reference trajectory within that feasible region and, thus, to convert the tracking problem into purely optimization problem.

Due to the nature of optimization-based receding horizon control, the existence of a solution for a certain horizon does not by itself guarantees the existence of the solution for a subsequent horizon. However, some embodiments of the invention are based on yet another realization that it is possible to select a subset of the feasible region, such that from any state of the machine and of the reference trajectory within that subset, there is a control maintaining the state of the machine within the subset. Accordingly, if a cost function representing the operation of the machine is optimized subject to constraints defined by that special subset of the feasible region, as contrasted with the optimization within the feasible region itself, there is a guarantee that the resulting optimal trajectory tracks the reference trajectory with the bounded error and is always feasible.

Accordingly, one embodiment discloses a method for controlling an operation of a machine according to a model of a reference trajectory. The method includes determining a feasible region for states of the machine and states of the reference trajectory defined by constraints of the machine, constraints on a reference trajectory and constraints on bounds of a tracking error; selecting a subset of the feasible region, such that for any state of the machine and any state of the reference trajectory within the subset, there is an admissible control maintaining the state of the machine within the subset for all admissible future states of the reference trajectory determined by the model and the constraints of the reference trajectory; and selecting an admissible control action for controlling the operation such that the state of the machine remains in the subset for all admissible future states of the reference trajectory.

Another embodiment discloses a controller for controlling an operation of a machine according to a reference trajectory by selecting a control action for controlling the operation such that a state of the machine for all admissible future states of the reference trajectory remains in a subset of the feasible region of states of the machine and states of the reference trajectory, wherein the feasible region is defined by constraints of the machine, constraints on the reference trajectory and constraints on bounds of a tracking error of the reference trajectory, and wherein the subset of the feasible region is a control invariant, such that for any state of the machine within the subset, there is a control maintaining the state of the machine within the subset for all admissible future states of the reference trajectory.

Yet another embodiment discloses a method for controlling an operation of a machine including determining a current state of the machine and a current state of the reference trajectory; selecting a control action from a plurality of admissible control actions that changes the current state of the machine into a next state of the machine such that the next state is within a control invariant subset for all admissible future states of the reference trajectory; and applying the control action to the machine.

BRIEF DESCRIPTION OF THE FIGURES

FIGS. 16A and 16B are block diagram of methods that use the control invariant subset according to some embodiments of the invention.

DETAILED DESCRIPTION OF THE PREFERRED EMBODIMENTS

Some embodiments of the invention provide a system and a method for controlling an operation of a machine according to a model of a reference trajectory. Some embodiments control the machine using an optimization-based receding horizon control subject to constraints that guarantees the feasibility of tracking the reference trajectory with an error defined by bounds of a tracking error. A non-limited example of the receding horizon control is a model predictive control (MPC).

Figure 1:
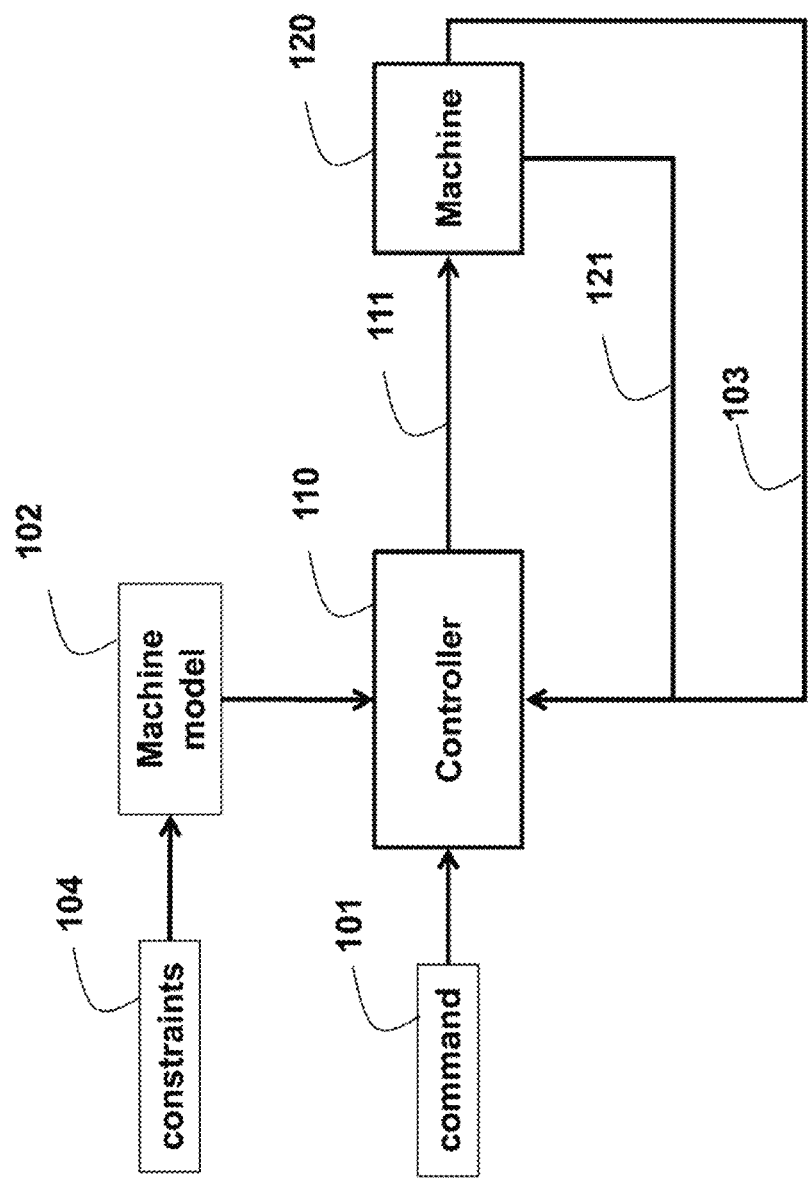
FIG. 1 is a block diagram of a controller and machine according to embodiments of the invention.

FIG. 1 shows an example machine 120 connected to controller 110, e.g., the MPC controller, according to some embodiments of the invention. The controller 110 is programmed according to a model 102 of the machine. The model can be a set of equations representing changes of a state 121 and output 103 of the machine 120 over time as functions of current and previous inputs 111 and previous outputs 103. The model can include constraints 104 that represent physical and operational limitations of the machine. One embodiment expresses the model 102 as a linear difference equation $$x(k+1)=Ax(k)+Bu(k)$$

$$y(k)=Cx(k) \quad (1)$$

where k is a time instant when the signals are sampled, u is the machine input, y is the machine output, x is the state of the machine, and A, B, C, are parameters of the model of the machine During the operation, the controller receives a command d 101 indicating the reference behavior of the machine. The command can be, for example, a motion command. In response to receiving the command 101, the controller generates input u 111 for the machine. In response to the input, the machine updates the output y 103 and the state x 121 of the machine.

The machine, as referred herein, is any device that can be controlled by certain manipulation input signals (inputs), possibly associated to physical quantities such as voltages, pressures, forces, and to return some controlled output signals (outputs), possibly associated to physical quantities such as currents, flows, velocities, positions. The output values are related in part to previous machine output values, and in part to previous and current input values. The dependency of previous inputs and previous outputs is encoded in the machine state. The operation of the machine, e.g., a motion of the machine, can include a sequence of output values generated by the machine following the application of certain input values.

The reference operation of the machine according to the reference trajectory is the planned operation of the machine. Such operation, however, may not exactly be realizable due to physical and specification constraints. The tracking error of the machine is a measure of the difference between the reference operation of the machine and the actual operation obtained by applying a certain input to the machine.

A model for the machine operation is a set of equations that describe how the machine outputs change over time as functions of current and previous inputs, and previous outputs. The state of the machine is any set of information, in general time varying, for instance an appropriate subset of current and past inputs and outputs, that, together with a model of the machine and future inputs, can uniquely define the future motion of the machine.

The machine can be subject to physical and specification constraints limiting the range where the outputs, the inputs, and also possibly the states of the machine are allowed to operate.

The controller is hardware or a software program executed in a processor, e.g., a microprocessor, which at fixed or variable period sampling intervals receives the machine outputs and the reference operation of the machine motion, and determines, using this information, the inputs for operating the machine.

Figure 2:
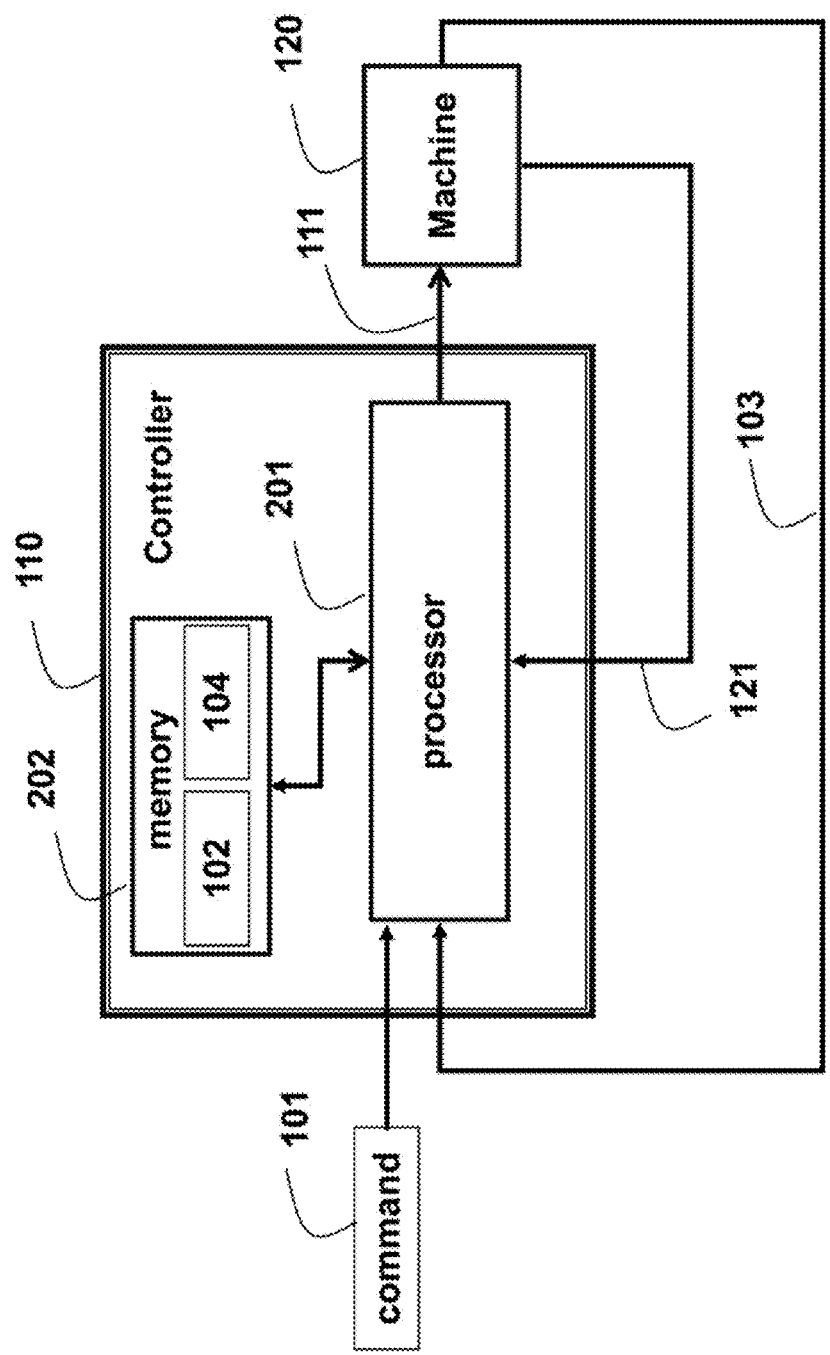
FIG. 2 is a block diagram of the controller according to embodiments of the invention.

FIG. 2 shows a block diagram of the controller 110 according one embodiment of the invention. The controller 110 includes a processor 201 connected to a memory 202 for storing the model 102 and the constraints 104, such as constraints of the machine, e.g., physical and specification constraints, constraints on a transient of the reference trajectory and constraints on bounds of a tracking error. For example, the constraints on the transient of the reference trajectory can include a possible type of changes of the state of the reference trajectory, rates of the change of the state of the reference trajectory among others. The bounds of the tracking error can include the allowed difference between a function the state of the machine and a function of the state of the reference trajectory. The function can be, e.g., identity function, linear combination, etc.

The controller actuates the machine so that the machine output follows a reference d, 101, which is the output generated by a reference model that represents the reference trajectory of the machine $$r(k+1)=A_r r(k)+B_r \gamma(k),$$

$$d(k)=C_r r(k), \quad (2)$$

where r is a reference state of the reference model and r is a reference output of the reference model, $\gamma$ is the reference input, and $A_r$, $B_r$, $C_r$, are the parameters that define the model of the reference trajectory.

In some embodiments, the model of the reference trajectory includes uncertainty, which is modeled without knowing precisely the value of reference input $\gamma$. As opposed to the machine input u, the reference input $\gamma$ is not assigned by the controller by some external entities, such as a human operator or high level supervisory software. The reference input is a modification of the current state of the reference trajectory. The controller selects the machine input u in reaction to the reference input $\gamma$, but cannot change the reference input $\gamma$.

The machine is subject to constraints that describe physical and operational limits, which can be expressed by the set of linear inequalities $$x(k) \in X, u(k) \in U, \forall k \geq 0, \quad (3)$$

where X, U are polyhedral set of states and inputs that define the admissible states and inputs, respectively, via linear inequality constraints. For example, a polyhedral set can be represented by linear inequalities, e.g., $$X=\{x:Hx \leq K\}.$$

Checking if a point belongs to the set can be achieved by verifying the linear inequalities for the point, i.e., $$x(k) \in X \Leftrightarrow Hx(k) \leq K.$$

An admissible state of the machine is a state x that satisfies the constraints of the state of the machine, e.g., as described in Equation (3). An admissible control of the machine is an input u that satisfies the input constraints, e.g., as described in Equation (3). An admissible trajectory of the machine whose model is described, e.g., by Equations (1) and (3) is a sequence of admissible states of the machine (x(0), x(1), . . . , x(i), x(i+1), . . . ) where each state of the machine x(k+1) is related to the previous state x(k) by Equation (1) for an admissible input u(k). Given a machine state $x_0$ the admissible future states of the machine are all the states of the machine $x_1$ such that there exists an admissible trajectory of the machine that starts at $x_0$ and ends at $x_1$.

Some embodiments of the invention are based on a realization that the transient of the reference trajectory can be constrained, e.g., based on specification of the machine. Such realization allows limiting unpredictability of the transient stage of operation. In addition, the constraints on the transient of the reference trajectory can reduce the need for determining the reference trajectory in advance, which can be advantageous for some controller with limited computation resources.

Some embodiments use only a model of the reference motion profile, wherein $$r(k) \in R, \gamma(k) \in \Gamma, \forall k \geq 0, \quad (4)$$

wherein R and Γ are polyhedral sets that define the admissible values of the reference state and of the reference input, respectively. In this case the constraints in Equation (4) are satisfied by the reference generated by the model in Equation (2).

An admissible state of the reference trajectory is a reference state r that satisfies the constraints of the state of the reference trajectory, e.g., as described in Equation (4). An admissible input of the reference trajectory is an input γ that satisfies the input constraints of the reference trajectory, e.g., as described in Equation (4). An admissible trajectory of the reference whose model is described by, e.g., Equations (2) and (4) is a sequence of admissible states of the reference $(r(0), r(1), \ldots, r(i), r(i+1), \ldots)$ where each state of the reference trajectory $r(k+1)$ is related to the previous state $r(k)$ by Equation (2) for an admissible input of the reference trajectory $\gamma(k)$. Given a reference trajectory state $r_0$ the admissible future states of the reference trajectory are all the states of the reference trajectory $r_1$ such that there exists an admissible trajectory of the reference that starts at $r_0$ and ends at $r_1$.

Figure 3:
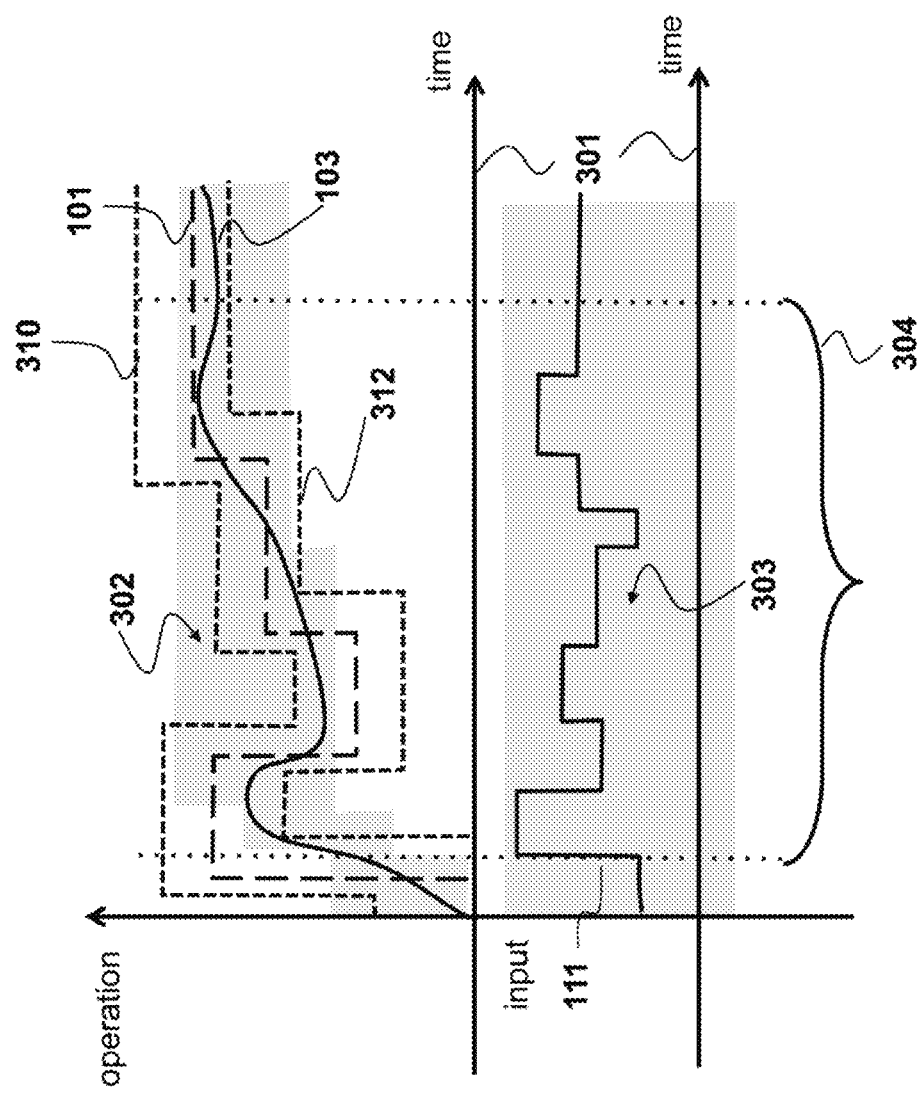
FIG. 3 is a timing diagram of machine motions according to embodiments of the invention.

FIG. 3 shows a timing diagram of the operation, e.g., motions, of the machine 120 according to some embodiments of the invention. The controller 110 generates the input 111 for the machine to perform the reference operation while enforcing the constraints using the expected machine behavior according to the model. The controller at each time k 301, solves a finite time optimal control problem for a prediction interval 304, e.g., from the current time till the N next times. The constraints can include constraints of the machine including regions of feasible 302 and feasible input 303.

Some embodiments of the invention are based on another realization that in some applications, it is important to guarantee that the tracking error is bounded within the predefined bounds, although the tracking error needs not be zero. In those applications, the tracking of the reference trajectory can also be represented as a constraint to be satisfied. In those embodiments, the constraints also include constraints on bounds 310 and 312 of a tracking error between the reference trajectory 101 and the actual trajectory. In one embodiment constraints on bounds of a tracking error include $$\|y(k) - d(k)\| \leq \epsilon, \forall k \geq 0, \quad (5)$$

wherein ε is the allowed tracking error bound.

Some embodiments of the invention are based on a realization that the transient of the reference trajectory can be constrained, e.g., based on specification of the machine. Such realization allows limiting unpredictability of the transient stage of operation. In addition, the constraints on transient of the reference trajectory can reduce the need for determining the reference trajectory in advance, which can be advantageous for some controller with limited computation capabilities.

For example, although Equation (5) has to be satisfied at any point of time, some embodiments have knowledge of the future values of the reference motion, r only along a limited future horizon. The reference motion needs to satisfy Equation (2) and Equation (4), but can be unknown.

Figure 4:
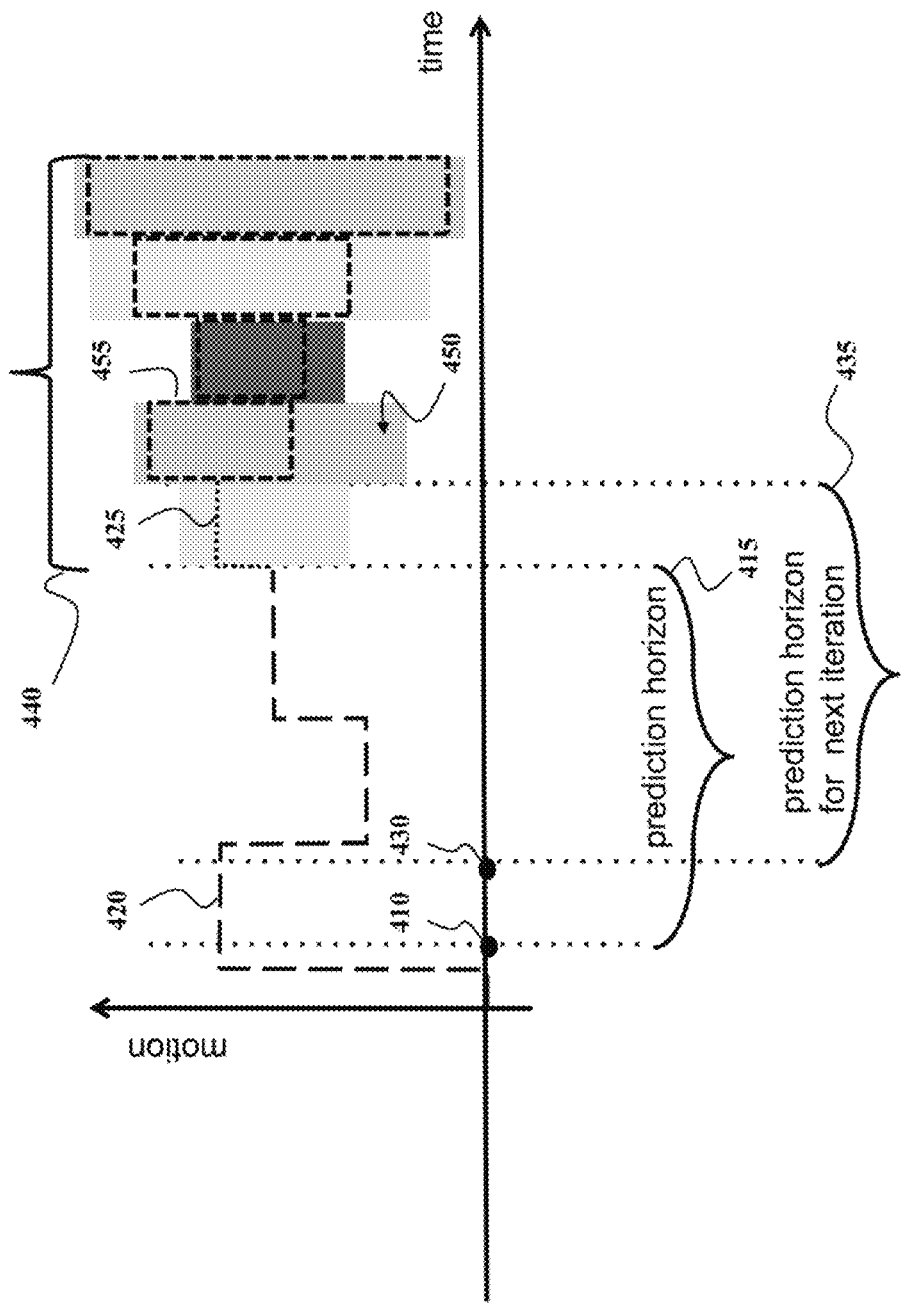
FIG. 4 is a diagram of a model of the reference trajectory and constraints on a transient of the reference trajectory according to embodiments of the invention.

FIG. 4 shows a diagram of the uncertainty of the model of the reference trajectory and the constraints on the transient of the reference trajectory. For example, for some iterations, such as a current iteration at a current time 410 for a prediction horizon 415, the reference trajectory 420 can be known. But for some other iterations, e.g., for a next iteration at a time 430 for a next prediction horizon 435, the reference trajectory at a step 425 may not be known.

The model of the reference trajectory constrains a range 440 of possible future reference motions, thus providing the constraints on transients of the reference trajectory. The constraints can be determined in advance, but also can vary in dependence to previously determined trajectory. For example, the constraints on the reference trajectory at a specific time can be determined by a region 450. However, when the trajectory is determined at a step 425, the constraints on the reference trajectory can be tightened to a region 455. Thus, at the specific iteration, the region 455 defines the constraints on the reference trajectory.

The constraints on the state of the machine, constraints on the reference trajectory and the constraints on bounds of a tracking error form a feasible region of a state of the machine and a state of the reference trajectory. Accordingly, it is possible to optimize the control maintaining the state of the machine and the state of the reference trajectory within that feasible region and, thus, to convert the tracking problem into a purely optimization problem.

Figure 5:
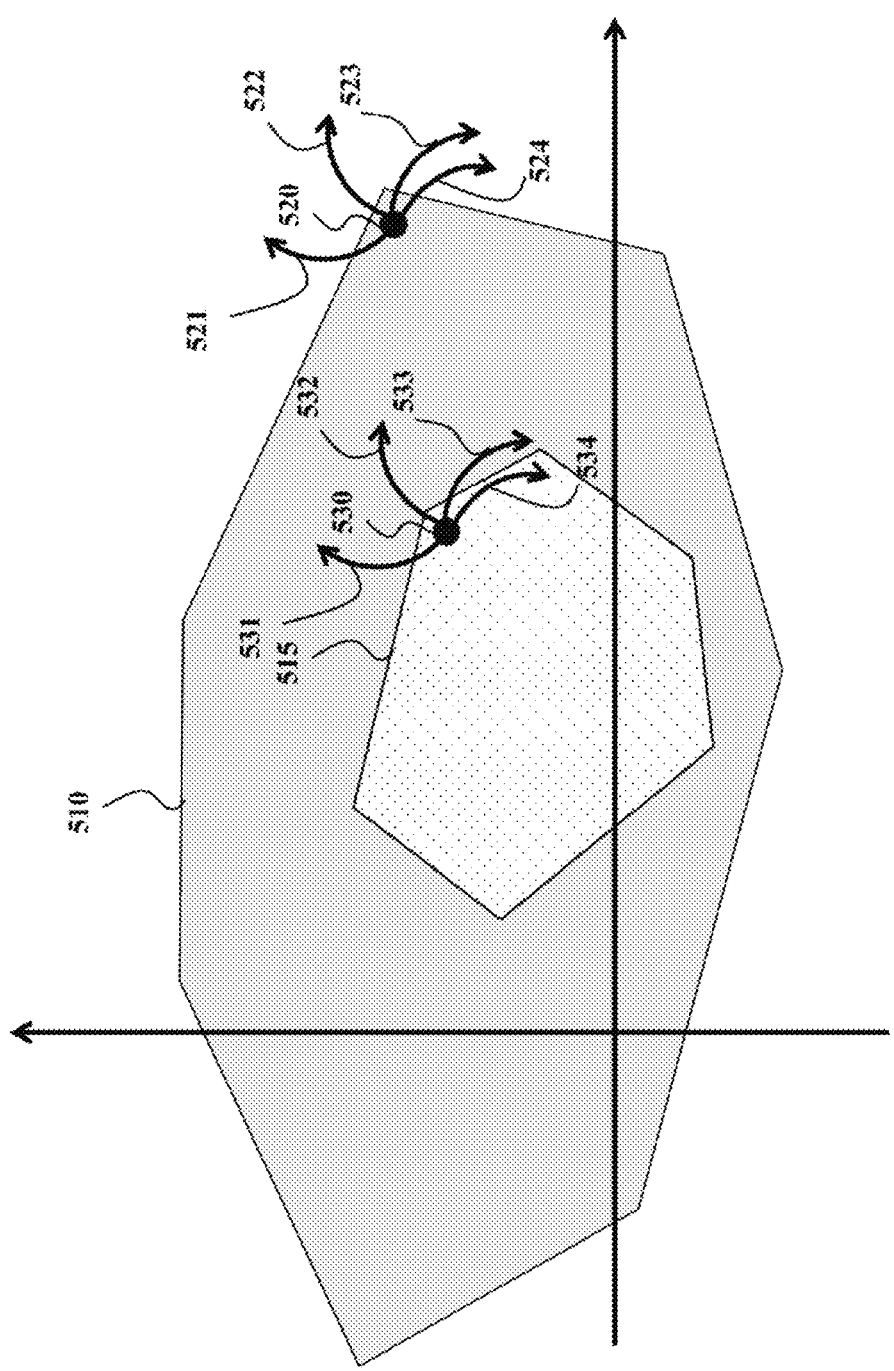
FIG. 5 is an example of a two-dimensional projection of the feasible region form by various constraints according to embodiments of the invention.

FIG. 5 shows an example of a two-dimensional projection of the feasible region 510 defined by various constraints according to embodiments of the invention. Typically, the feasible region is a multi-dimensional polytope determined by hyperplanes, which are represented by linear inequalities, along multiple dimensions corresponding to the constraints in Equations (3) and (4).

Due to the nature of receding horizon control, the existence of a solution for a certain horizon does not by itself guarantees the existence of the solution for a subsequent horizon. For example, the state of the machine and a state of the reference trajectory 520 can be optimal and feasible for one iteration, but all control actions 521-524 that controller is allowed to take during the next iteration can bring a state of the machine outside of the feasible region 510.

Some embodiments of the invention are based on yet another realization that it is possible to select a subset 515 of the feasible region, such that from any state of the machine within that subset, there is a control action maintaining the state of the machine within the subset for the known future states of the reference trajectory or for all admissible future states of the reference trajectory. For example, for any state such as a state 530 within the subset 515 and within all possible control actions 531-534 that the controller can execute, there is at least one control action 534 that maintains the state of the machine and reference within the subset 515.

Accordingly, if a control action for controlling the operation is selected such that the state of the machine remains in that special subset 515 of the feasible region, and the feasible region is generated also according to Equation (5), then there is a guarantee that the resulting optimal trajectory tracks the reference trajectory with the bounded error and every future state of the machine always admits at least one feasible control action. In this case, the subset 515 is a control invariant set. For example, the selection of the control action can be performed by optimizing a cost function representing the operation of the machine subject to constraints defined by that special subset 515 of the feasible region, as contrasted with the optimization within the feasible region 510 itself.

Figure 6:
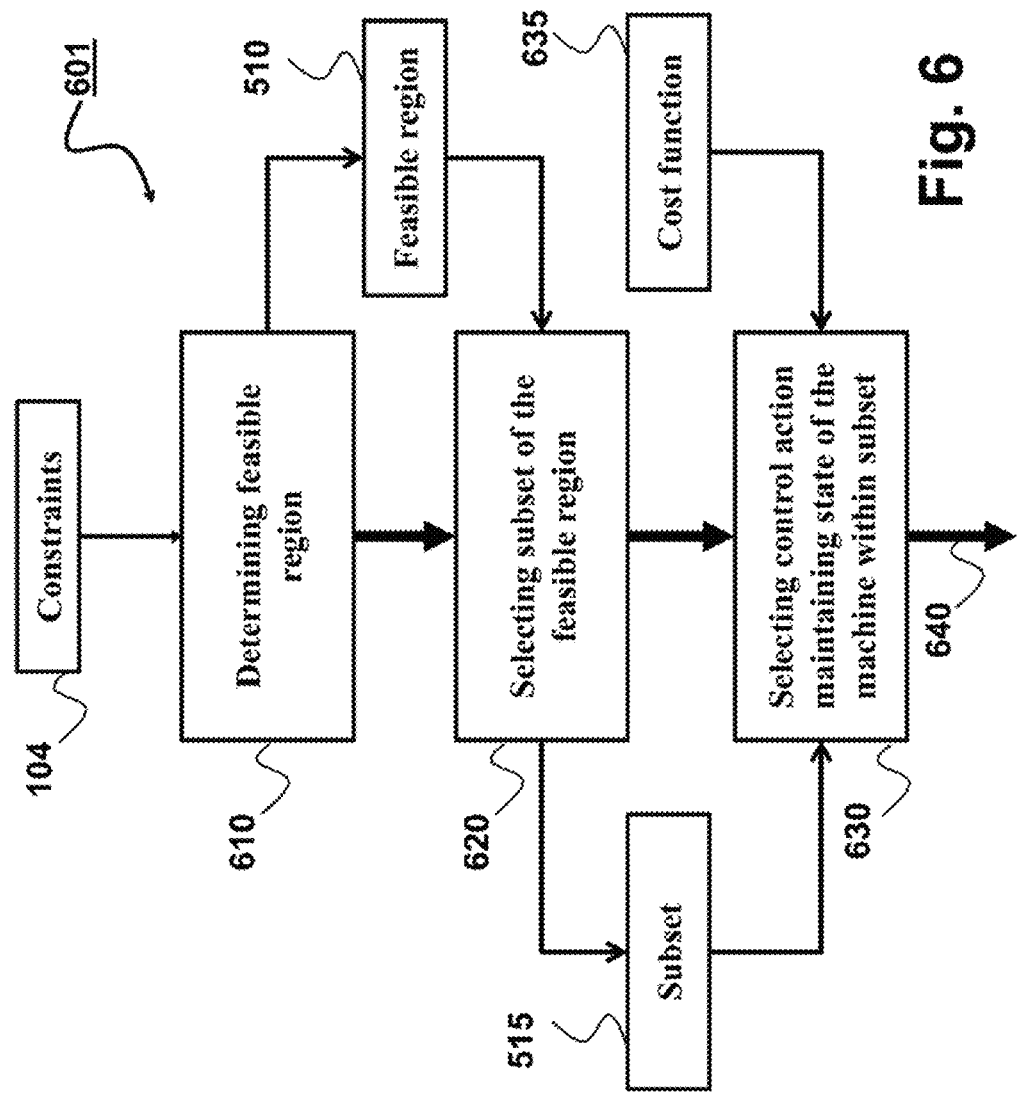
FIG. 6 is a block diagram of a method for controlling an operation of a machine according to a model of a reference trajectory in accordance with one embodiment of the invention.

FIG. 6 shows a block diagram of a method for controlling an operation of a machine according to a model of a reference trajectory in accordance with some embodiments of the invention. The method can be executed by a processor 601 of the controller 110.

The method determines 610 a feasible region 510 of a state of the machine and a state of the reference trajectory defined by constraints 104 including constraints of the machine, constraints on transient of the reference trajectory and constraints on bounds of a tracking error. Next, the method selects 620 a subset 515 of the feasible region, such that from any state of the machine within the subset, there is a control maintaining the state of the machine within the subset and selects 630 a control action 640 for controlling the operation such that the state of the machine remains in the subset. In one embodiment, the selecting includes optimizing a cost function 635 representing the operation of the machine subject to constraints defined by the subset region 515. The cost function is optimized iteratively for a fixed time horizon to produce a control action 640 of a current iteration.

In some embodiments, all steps of the method of FIG. 6 are executed during the operation of the machine. In alternative embodiments, the steps 610, 620 are executed before the machine operation, and the cost function 635 or other principles of the selection of the control action are also defined before machine operation. Such operations can be executed either in a microprocessor or in a general purpose computing machine, such as a desktop computer, laptop, or engineering workstation. The results of step 620 and the cost function 635 are programmed in the memory of the microprocessor 110, and the step 630 is the only step that is repeatedly executed during operation of the machine.

Determining Subsets of Feasible Space Based on Control Invariance Principles

Some embodiments determine the set 515 as a control invariant set for the machine model (1) and reference model (2) subject to constraints (3), (4). In some variations, when the reference input γ is unknown, the set 515 is a control invariant set for the machine of Equations (1)-(2) subject to constraints given by Equations (3)-(4) for disturbances γ in the set Γ of the reference inputs.

Figure 7:
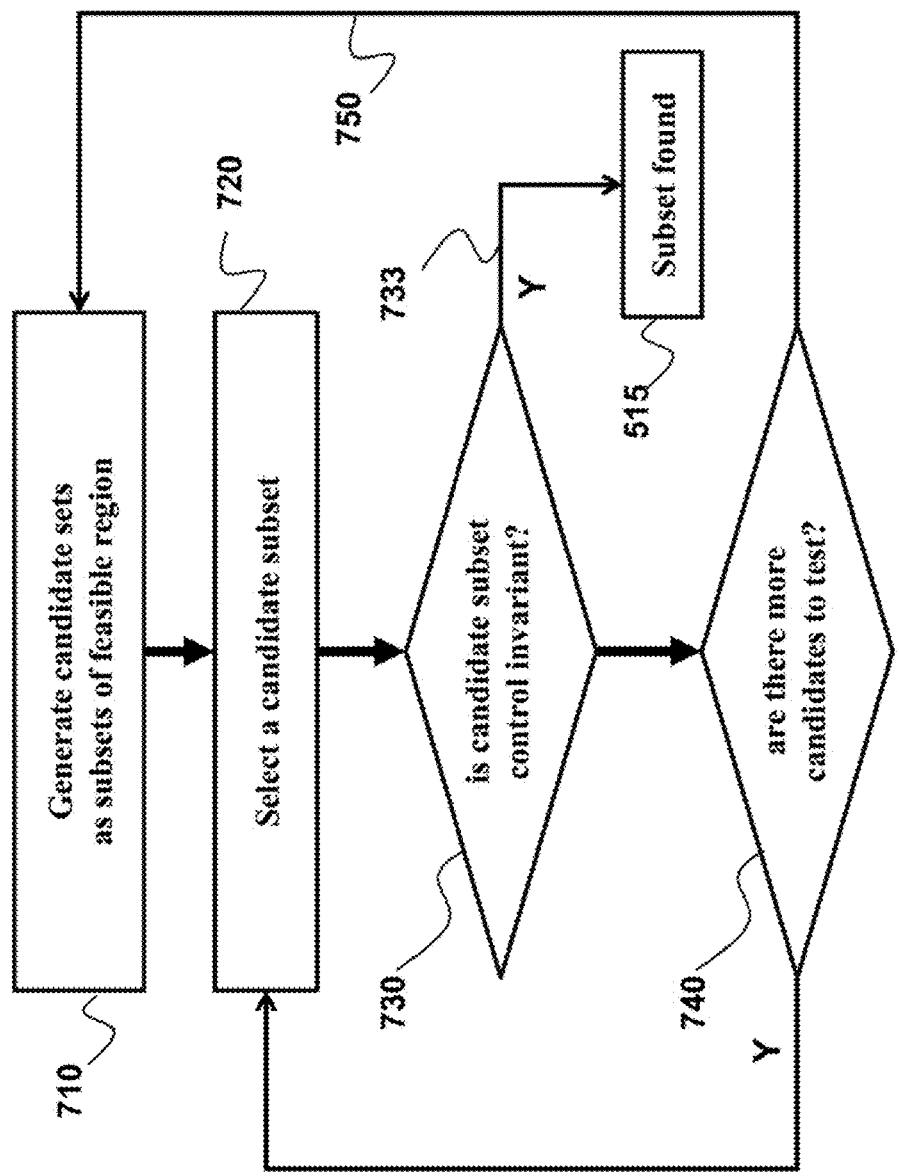
FIG. 7 is a block diagram of a method for determining a control invariant subset according to one embodiment of the invention.

FIG. 7 shows a block diagram of a method for determining the set 515 according to one embodiment. The method generates 710 a number of candidate sets as subsets of the feasible region 510. A candidate subset 720 is selected from the feasible region, and tested 730 to verify whether the candidate subset is a control invariant. If yes 733, the candidate subset is selected as the subset 515 and the methods terminates. Otherwise, if another candidate subset is available 740, the next candidate subset is selected and the test is repeated. Otherwise 750, new candidates are generated 710.

Figure 8:
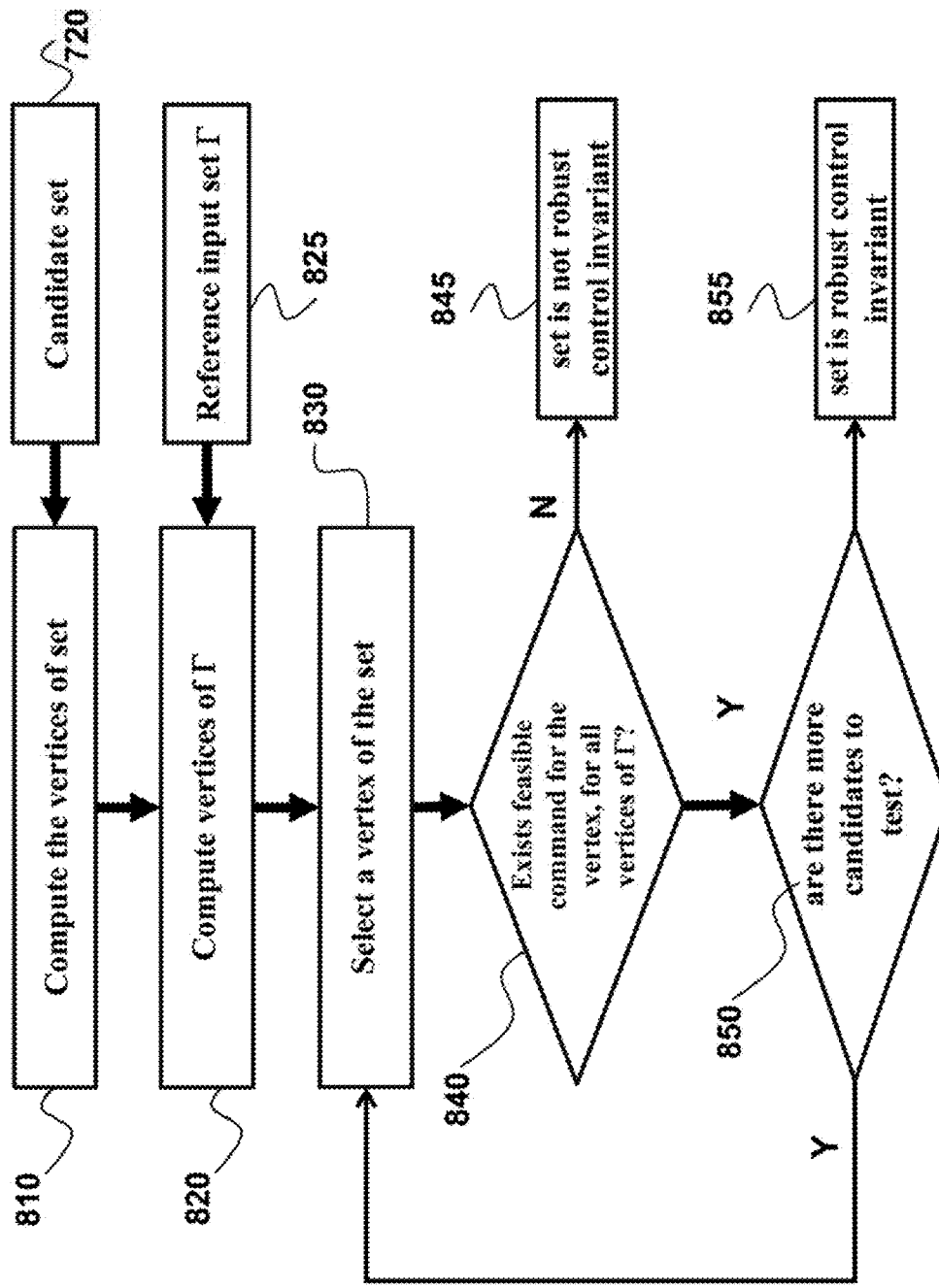
FIG. 8 is a block diagram of a test according to one embodiment of the invention for verifying whether a polyhedral candidate subset is the control invariant.

FIG. 8 shows a block diagram of a test according to one embodiment of the invention for verifying whether a polyhedral candidate subset 720 is control invariant. The method computes 810 the vertices of the polyhedron candidate set 720 and computes 820 the vertices of polyhedral set Γ 825 of the reference inputs. Then, a vertex of the candidate set is selected 830, and checked 840 whether there exists a control action u such that for every vertex of Γ the constraints in Equations (3), (4), (5) are satisfied. This step can be implemented by search or mathematical programming. If such control action u cannot be found, then the set is not control invariant 845. If such control action can be found and there are no more vertices to be checked 850, then the set is robust control invariant 855. Otherwise, the next vertex is selected.

However, the generation and verification of candidate sets can take a significant amount of time, and one embodiment uses an automated procedure to generate and verify the candidate sets.

Because the subset 515 is a control invariant set, a method for control invariant set computation can be used for generating the set 515. Such a method can be modified with the capability of enforcing constraints in Equation. (5) and considering the input γ to the model of the reference (2) as source of uncertainty.

Figure 9:
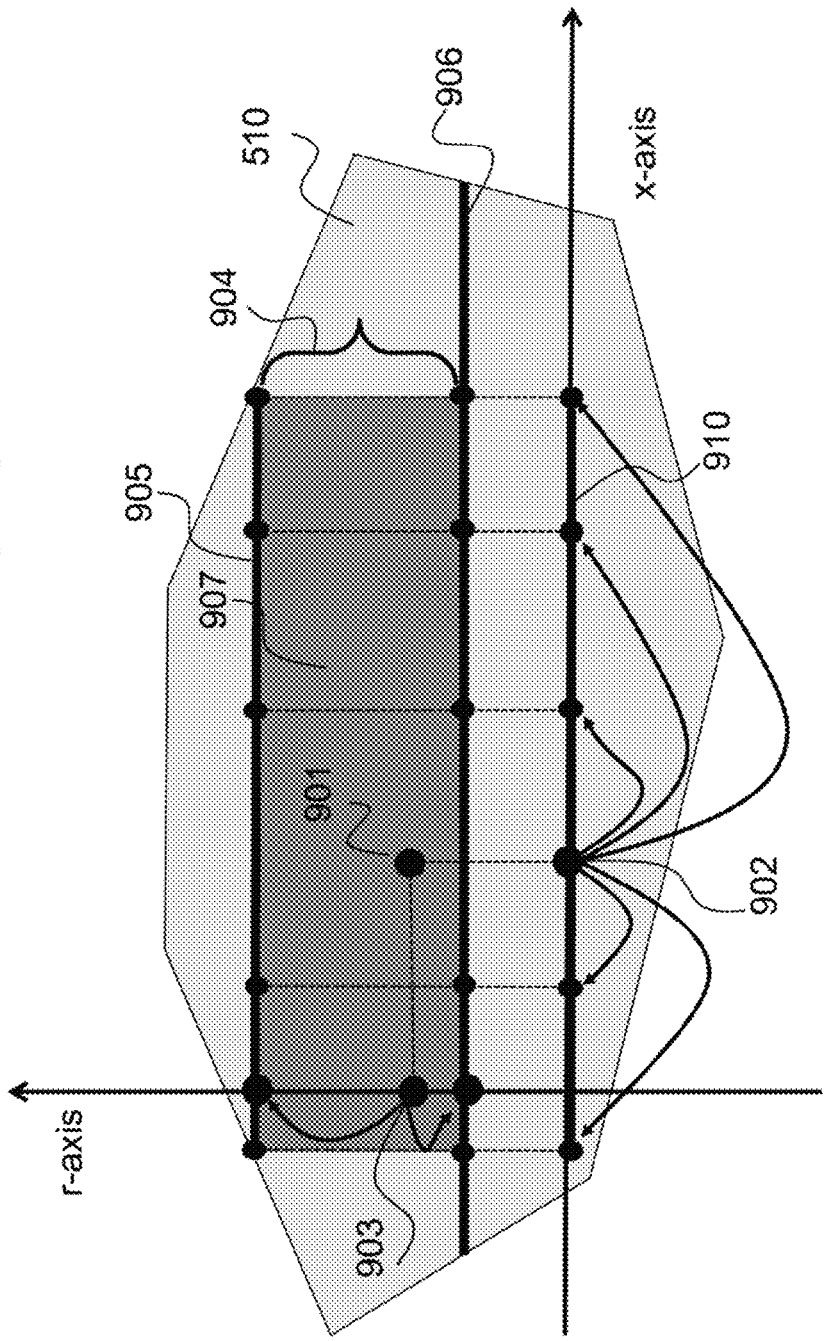
FIG. 9 is a schematic of some principles behind the determination of the control invariant subset according to one embodiment of the invention.

FIG. 9 illustrates the principles behind the determination of the subset 515 according to one embodiment of the invention. The feasible set 510 of the state of the machine state and the state of the reference trajectory is $$X_{x,r} = \{[x'r']: x \in X, \|y-d\| \le \epsilon, r \in R\} \quad (6)$$

The state of the machine 902 and the state of the reference trajectory 903 define a point in (x,r) 901 in the feasible region 510. Given the admissible set 904 for future states of the reference trajectory according to $$C_\gamma(r) = \{\gamma: A_r r + B_r \gamma \in R\} \quad (7)$$

the future state of the machine and the future state of the reference trajectory can be anywhere in the polyhedron 907, delimited by segments 905, 906. Thus, the controller can take any control action such that the future state of the machine 902 remains in the segment 910, so that the combination of the future machine state and future reference state remains in the polyhedron 907.

If the set $\underline{C}_{x,r}$ 907 is such that there is always a control action that keeps the machine state and reference state 901 in in the set 907 for the entire admissible range of the reference 904

$$\underline{C}_{x,r} = \{[x'r']' \in C_{x,r}: \exists u \in U, Ax+Bu \in X, \|C(Ax+Bu) - C_r(A_r r + B_r \gamma)\| \le \epsilon, \forall \gamma \in \mathcal{C}_{\mathcal{E}}\},$$

it is always possible to guarantee $$[(Ax+Bu)'(A_r r + B_r \gamma)']' \in \underline{C}_{x,r},$$

which guarantees that the constraints on the machine and on the tracking error bounds are satisfied. Notably, this procedure can be repeated at a next step because the update states are still inside $\underline{C}_{x,r}$, hence recursively guaranteeing the constraints enforcement.

Figure 10:
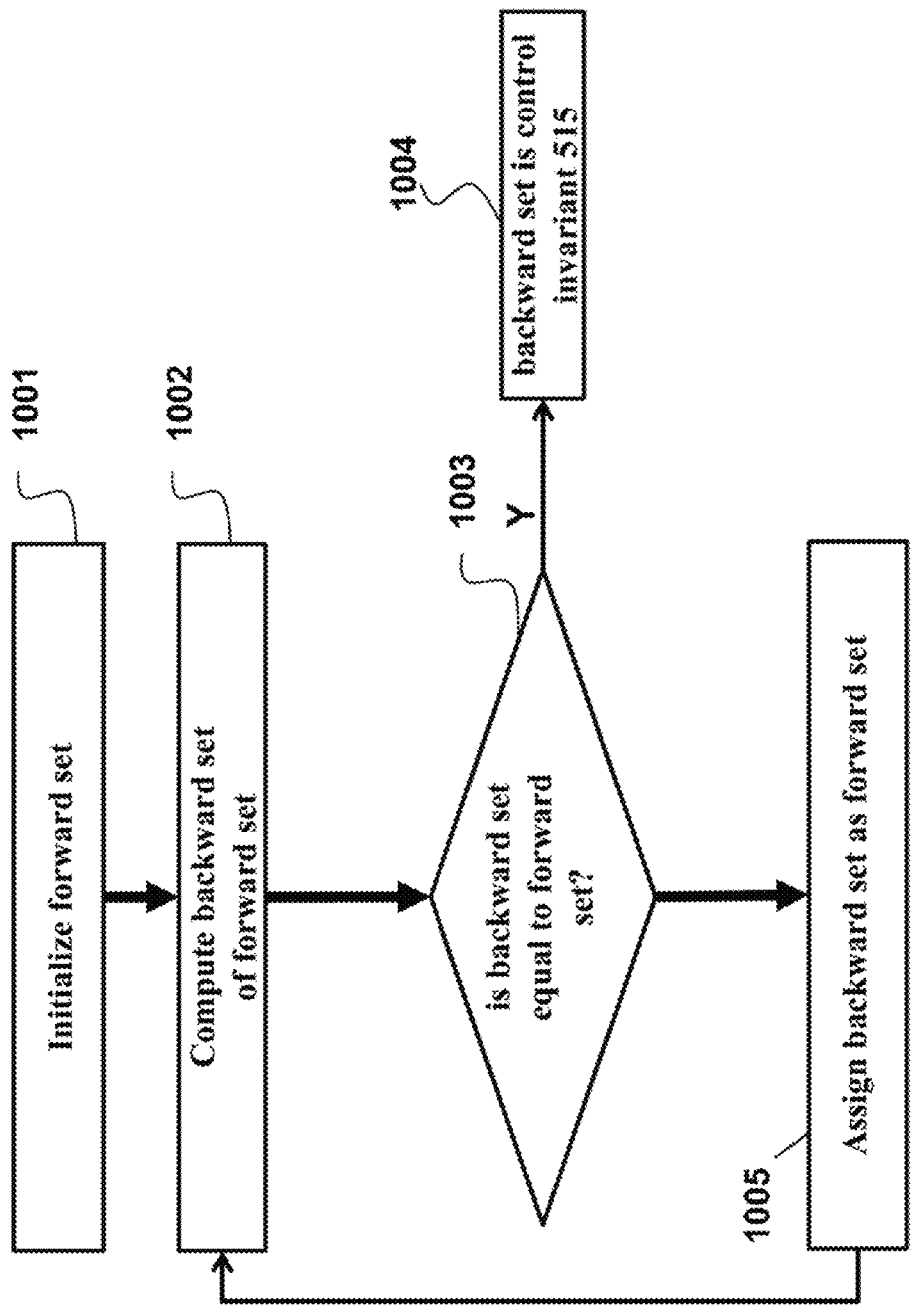
FIG. 10 is a diagram of a method for selecting the control invariant subset by performing iteratively a backward-reachable region computation according to one embodiment of the invention.

FIG. 10 shows a diagram of a method for selecting the subset $\underline{C}_{x,r}$ by performing iteratively a backward-reachable region computation until a termination condition is satisfied. The backward-reachable region computation removes all states from the current feasible region for which there is no control that maintains the state of the machine within the feasible region for reference trajectories satisfying the constraints on the transient of the reference trajectory.

For example, the backward-reachable region computation initializes 1001 at a step k=0 a current feasible region 1001 as the feasible region 510, $$\Omega_0 = \{[x'r'] \in X_{x,r}\}$$

then determines 1002 a backward-reachable region of the states of the machine and reference trajectory that can be transition to the current feasible region for all the value of the admissible reference input according to $$\Omega_{k+1} = Pre(\Omega_k, C_\gamma(r)) = \{[x'r'] \in X_{x,r}: \exists u \in U, (Ax+Bu, A_r r + B_r \gamma) \in \Omega_k, \forall \gamma \in C_\gamma(r)\}. \quad (9)$$

The computation of Equation (9) removes the states of the backward reachable region for which there exists no control action that keeps states into the current feasible region for all the admissible values of the future state of the reference.

At step 1003 the computation tests if the backward-reachable region is equal to the current feasible region, i.e., $\Omega_{k+1} = \Omega_k$. If yes 1004, the backward-reachable region is control invariant 515 and the computation stops. Otherwise 1005, the backward-reachable region is used as current feasible region in the next iteration (k=k+1) of the computation.

The backward-reachable region computation of FIG. 10 returns the largest existing control invariant set. However, because the set of admissible reference inputs is state dependent, the control invariant set is not a single convex polyhedron but a set of convex polyhedra, which makes the use of such subset in a real time control difficult. Also, the backward-reachable region computation of FIG. 10 can take significant amount of time (days, weeks, months).

Figure 11:
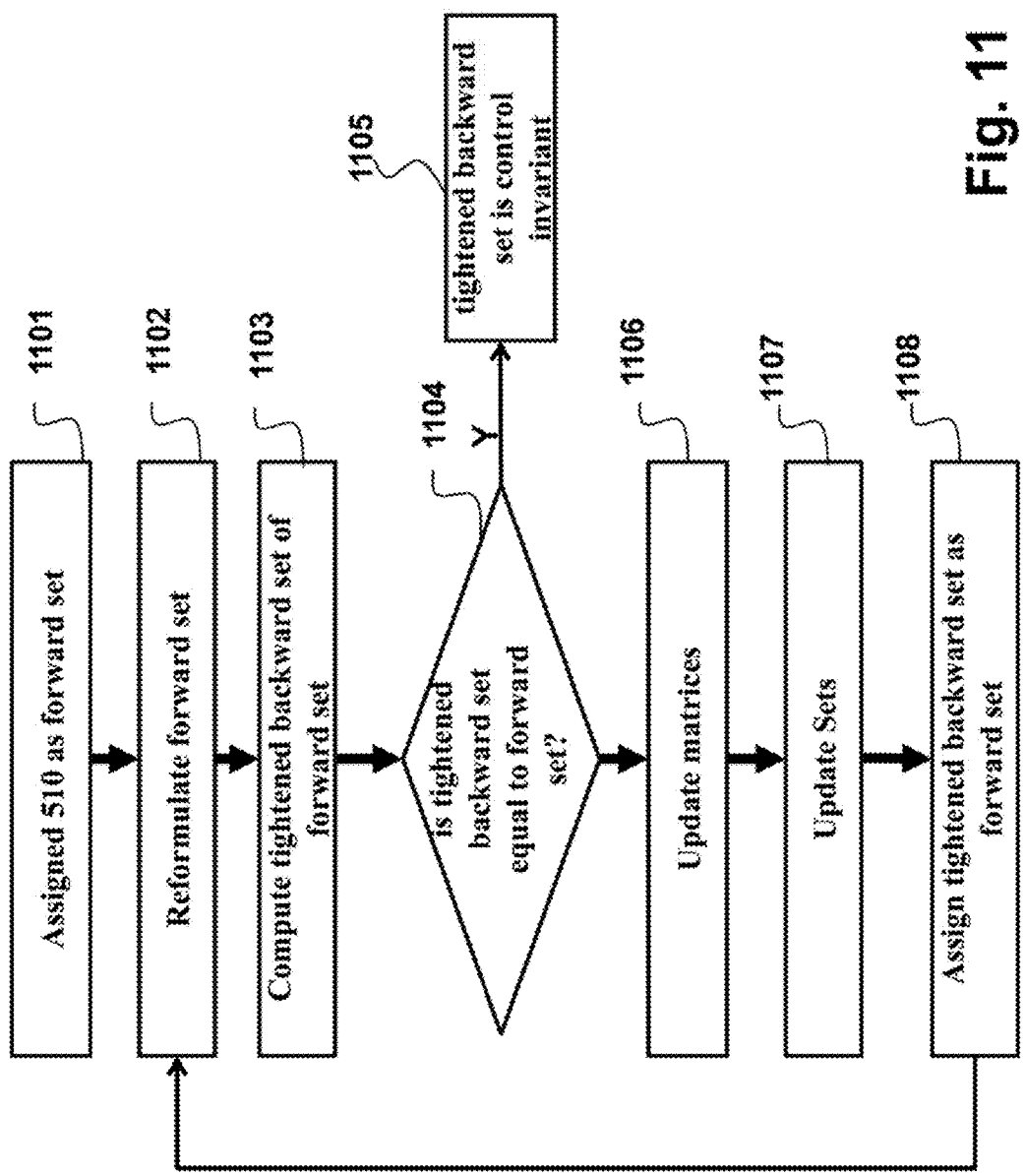
FIG. 11 is a block diagram of an alternative method that determines the control invariant set.

FIG. 11 shows a block diagram of an alternative method that determines a control invariant set which is slightly smaller than the largest subset, but is a single convex polyhedron. Also, the method of FIG. 11 is much faster, e.g., can determined the control invariant subset within minutes and/or hours.

The method initializes 1101 the matrices M, L, and the sets F, X, as $$k=0, M_0=C, L_0=C_r, F_0=\{e: \|e\| \le \epsilon\}, X_0=X$$

and the current feasible region $$\Omega_0 = \{[x'r']\in X_{x,r} : r\in C_r^\infty, (Cx-C_r r)\in F_0)\}.$$

Initially, the current feasible region is the feasible region. The method is performed iteratively, such that the states that cannot be maintained in the current feasible region for all the admissible values of the future disturbance are removed, thus forming a new current feasible region. The current feasible region is reformulated 1102 as polyhedral invariant subset of feasible region, in details as an intersection of a set of the states of the machine satisfying the constraints of the machine, the set of states on the trajectory satisfying some constraints on the transient of the reference trajectory, and the set of the states satisfying the error bounds constraints, such that a forward set $\Omega_k$ in the form $$\Omega_k = \{[x'r']\in X_{x,r} : r\in C_r^\infty, x\in X, (M_k x - L_k r)\in F_k\},$$

is obtained, where the constraints $r\in C_r^\infty$ describe the maximum output admissible set for the reference trajectory state, that is the largest set of reference trajectory states for which the reference state admits input for which all the constraints (3) are satisfied. To that end, checking the constraints on the state of the machine and the constraints on the state of the reference trajectory are decoupled and the full range of reference input allowing the reference trajectory to move from an admissible state, regardless if the future state of the reference trajectory is admissible, is accepted.

Then, the tightened backward-reachable region is determined 1103 according to $$\Omega_{k+1} = \{[x'r']\in X_{x,r} : \exists u\in U, r\in C_r^\infty, Ax+Bu\in X_k, (M_k(Ax+Bu) - L_k(A_r r + B_r \gamma))\in F_k, \forall \gamma\in\Gamma\}.$$

If the tightened backward-reachable region equals 1104 the current feasible region, i.e., $$\Omega_{k+1} = \Omega_k,$$

then 1105 the tightened backward-reachable region is control invariant 515 and the algorithm stops with $$C_{x,r} = \Omega_k.$$

Otherwise 1106, the matrices M, L are updated as $$M_{k+1} = M_k A, L_{k+1} = L_k A_r$$

and 1107 the sets F, X are updated as $$X_{k+1} = \{x\in X : Ax+Bu\in X_k\}$$

$$F_{k+1} = \{v : \exists u\in U, \exists b\in F_k, v = b - M_k Bu + L_k B_r \gamma, \forall \gamma\in\Gamma\}.$$

Then, the tightened backward-reachable region is assigned as new current feasible region 1108, and a new iteration is performed from 1102 with k=k+1.

Because in the method of FIG. 11 the variable $\gamma$ is now independent of the variable r, the resulting set $C_{x,r}$ is a polytope.

Figure 12:
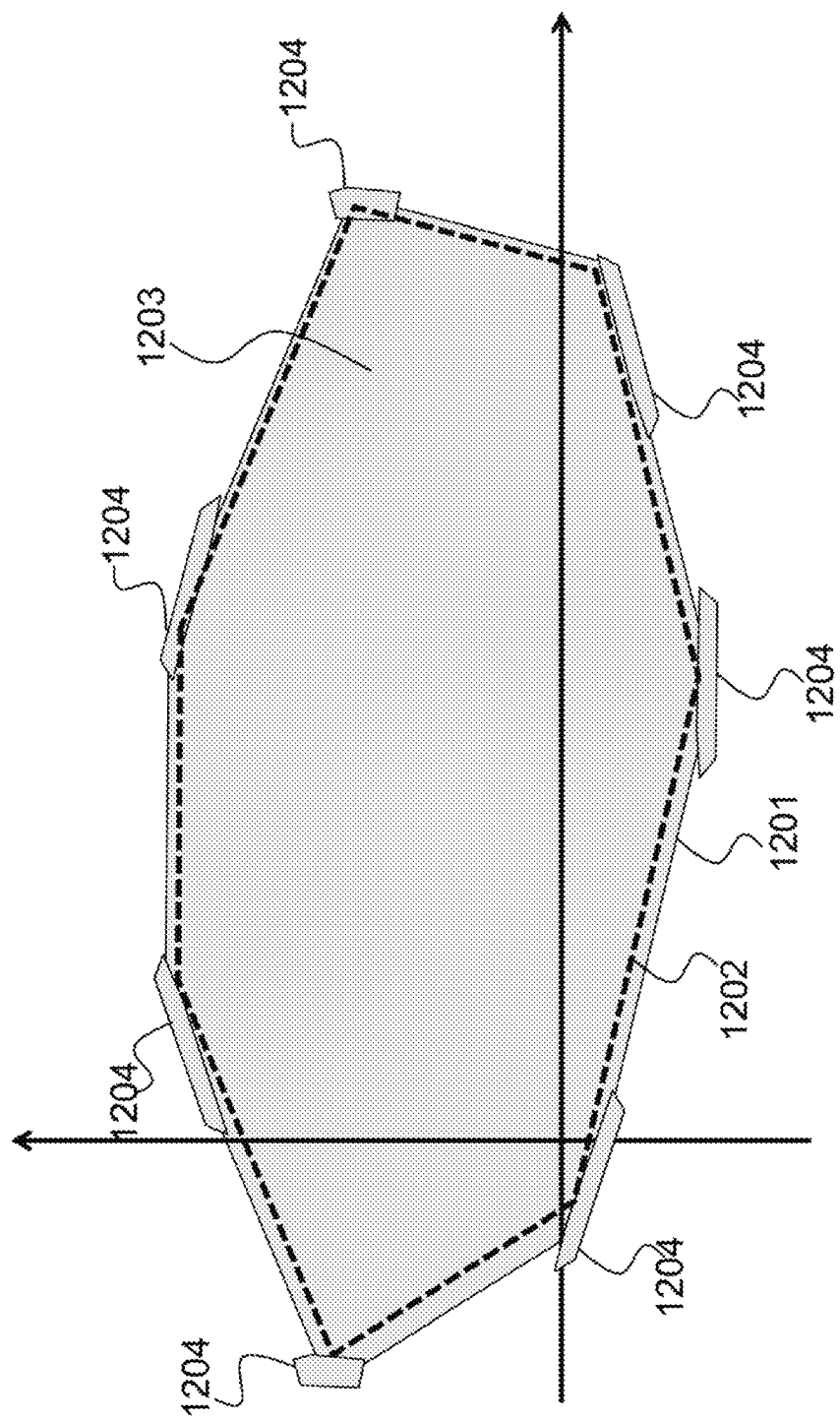
FIG. 12 is a schematic of an effect of the method of FIG. 11 with respect to the method of FIG. 10.

FIG. 12 shows an effect of the method of FIG. 11 with respect to the method of FIG. 10. Because the dependence of the reference input $\gamma$ on the reference state r is ignored, the subset 1201 obtained by the method of FIG. 11 is smaller than the set 1202 obtained by the method of FIG. 10, but the subset 1201 is a single convex polyhedron, while the subset 1202 includes a larger convex polyhedron 1203 and multiple smaller convex polyhedral 1204 at the borders, the union of which is not convex.

Tracking Control with Guaranteed Feasibility

Some embodiments of the invention select the control action by optimizing a cost function representing the operation of the machine subject to constraints defined by the control invariant subset of the feasible region, which has been computed using a model of the machine, a model of the reference trajectory, a current state of the machine, and a current state of the reference trajectory.

For cost functions that are linear or quadratic, the resulting problem can be efficiently solved by linear or quadratic programming possibly including integer variables. After the subset 515 is determined, different finite horizon problems for the control strategy are implemented by different embodiments depending on available amount of future information on the reference.

Figure 13:
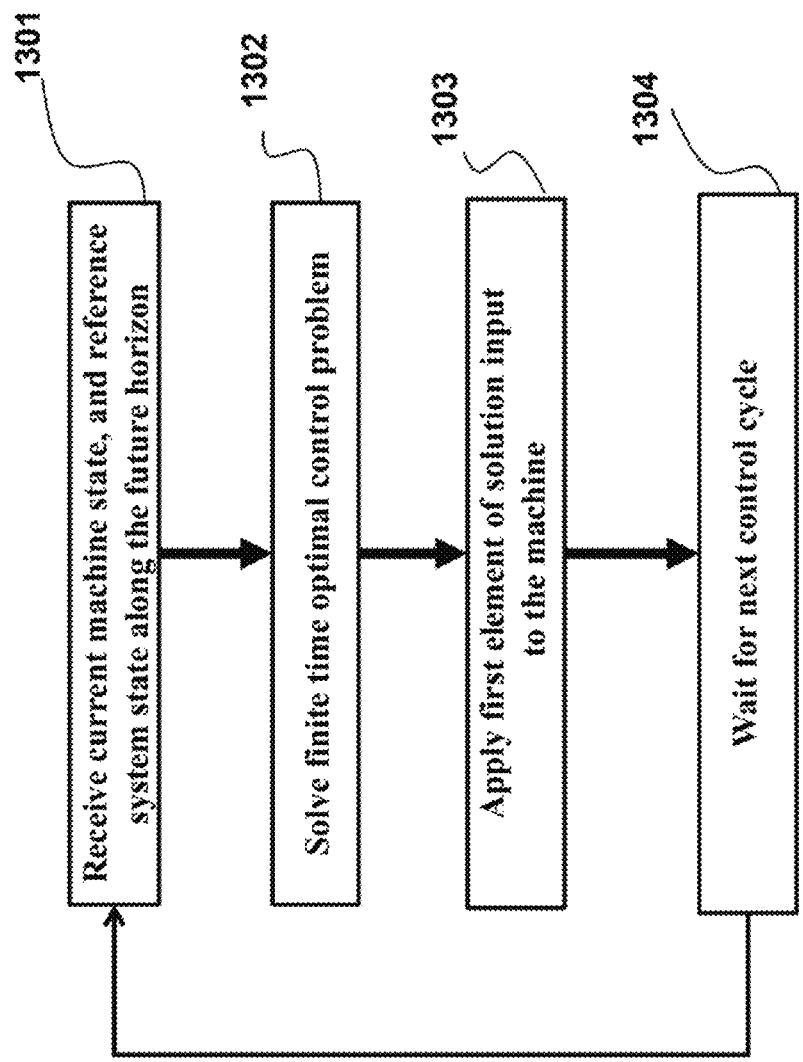
FIG. 13 is a block diagram of a control method according to one embodiment of the invention.

FIG. 13 shows a block diagram of a control method according an embodiment, in which the values of the reference system state r are available for the entire prediction horizon, but not available afterwards. At any control cycle, the machine state and the future references along the future prediction horizon are acquired 1301, and the finite horizon optimal control problem is solved 1302.

In one embodiment, the optimizing is based on future states of the reference trajectory along a prediction horizon. In this embodiment, the solution 1302 includes determining states of the reference trajectory along a prediction horizon using the current reference state and the current reference input subject to constraints on the transient of the reference trajectory, constraints of the feasible region for all the steps of the prediction horizon except for the last one, and constraints of the subset of the feasible region for the last step of the prediction horizon.

Additionally or alternatively, the solution 1302 can be according to $$\min_{u(k+0),\ldots,u(k+N-1)} F(x(k+N), r(k+N)) + \quad \text{Eqn (2)},$$

-continued $$\sum_{i=0}^{N-1} q(x(k+i), r(k+i), u(k+i)) \text{s.t.} (x(k+i), r(k+i)) \in X_{x,r},$$

$$i = 1, \ldots, N-1 (x(k+N), r(k+N)) \in C_{x,r} u(k+i) \in U,$$

$$i = 0, \ldots, N-1 \text{ Given } x(k), r(k),$$

$$r(k+1), r(k+2), \ldots r(k+N).$$

The first element of the optimal input solution u*(k) is applied 1303 to the machine, and, then, the controller waits 1304 for the next control cycle when the sequence is repeated.

Figure 14:
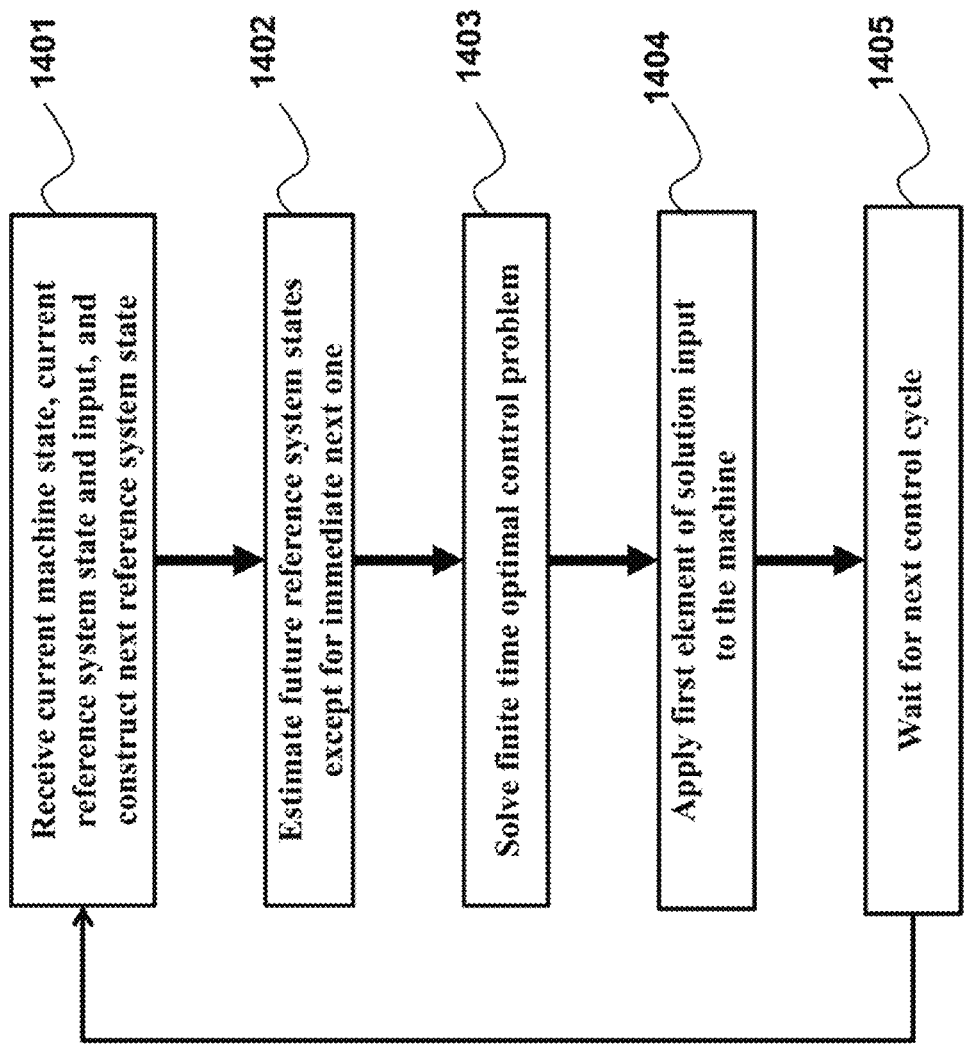
FIG. 14 is a block diagram of a control method according to another embodiment of the invention.

FIG. 14 shows a block diagram of a method according an embodiment when only the current value of the reference state r and the current value of γ are known. In this embodiment, the optimizing is based on a current reference state and a reference input and includes determining states of the reference trajectory along a prediction horizon using the current reference state and the current reference input. The determining is subject to constraints on the transient of the reference trajectory, constraints of the feasible region for a first step of the prediction horizon and constraints of the subset of the feasible region for remaining steps of the prediction horizon.

For example, one embodiment acquires 1401 the state of the machine and determines the next value of the state r of the reference trajectory from the current value of the state r of the reference trajectory and the current value of the input γ using the reference model that represents the reference trajectory of the machine, e.g., as in Equation (2). The step 1402 produces a guess of the following values of the state r by selecting the reference input γ such that the state r satisfies the constraints in Equation (2)

$$r(k+i) \in C_r^\infty.$$

The step 1403 is executed, and the finite horizon optimal control problem solved is $$\min_{u(k+0),\ldots,u(k+N-1)} F(x(k+N), r(k+N)) + \quad \text{Eqn (2)},$$

$$\sum_{i=0}^{N-1} q(x(k+i), r(k+i), u(k+i)) \text{s.t.} (x(k+i), r(k+i)) \in C_{x,r},$$

$$i = 1, \ldots, N u(k+i) \in U, i = 0, \ldots, N-1 \text{ Given } x(k),$$

$$r(k), r(k+1), r(k+2), \ldots r(k+N),$$

where the feasible subset region constraint is now used at all steps because the future value of the reference is guessed. Next, the first element of the optimal input solution u*(k) is applied 1404 to the machine, and, then, the controller waits 1405 for the next control cycle when the sequence is repeated.

Figure 15:
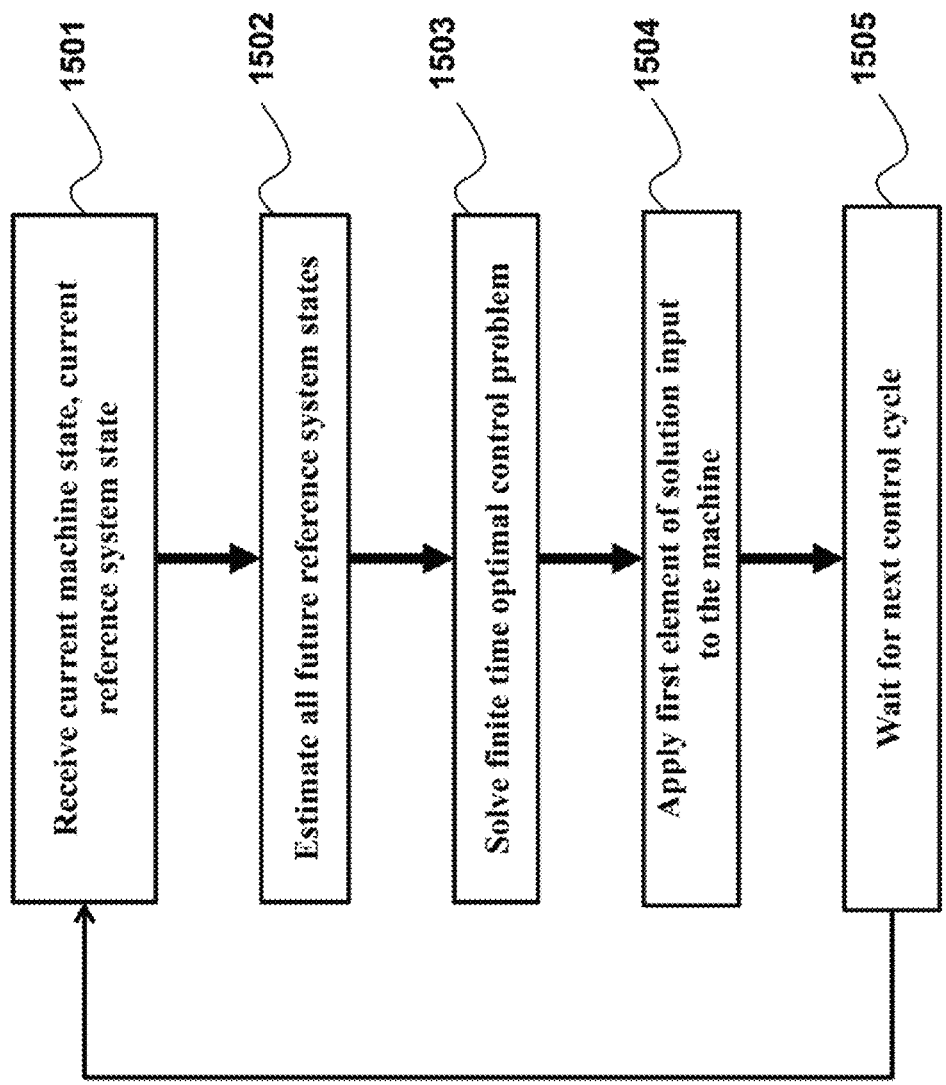
FIG. 15 is a block diagram of a method according to some embodiments when only a value of a state of the reference trajectory at the current time step is known.

FIG. 15 shows a block diagram of a method according an embodiment when only the value of the reference state r at the current time step is known. The method acquires 1501 the machine states and determines 1502 all the future reference system states (including the immediate next one) by selecting γ such that by the reference state r of a model of Equation (2) satisfies the constraints $$r(k+i) \in C_r^\infty.$$

The method solves 1503 the time optimal control problem $$\min_{u(k+0),\ldots,u(k+N-1)} F(x(k+N), r(k+N)) + \quad \text{Eqn (2)},$$

$$\sum_{i=0}^{N-1} q(x(k+i), r(k+i), u(k+i)) \text{s.t.} (x(k+i), r(k+i)) \in C_{x,r,u},$$

$$i = 0, \ldots, N-1 u(k+i) \in U, i = 0, \ldots, N-1 \text{ Given } x(k),$$

$$r(k), r(k+1), r(k+2), \ldots r(k+N),$$

where the set $$C_{x,r,u} = \{x, r, u : (Ax + Bu, A_r r + B_r \gamma) \in C_{x,r}, \forall \gamma : A_r r + B_r \gamma \in C_r^\infty\} \quad (10)$$

is the set of feasible machine states, feasible reference trajectory states and feasible machine inputs such that is the feasible machine input is applied to the feasible machine state, for all the future reference trajectory states generated by the feasible reference trajectory state and all the admissible reference inputs, the next machine state and reference state is in the subset 515 and hence satisfies constraints in Equations (3), (5). Such set (10) is directly computed from the control invariant subset 515. Next, the first element of the optimal input solution u*(k) is applied 1504 to the machine, and, then, the controller waits 1505 for the next control cycle when the sequence is repeated.

Some embodiments are based on a realization that if the cost function is linear or convex quadratic, then if the subset 515 is determined using backward-reachable region computation of FIG. 10, the optimization problems are mixed-integer linear or quadratic programming problems. This because the subset is the union of polyhedra, and the belonging of a vector v to a union of polyhedra $X_i = \{x: H_i x \leq K_i\}$, $i=1, \ldots, n_p$ can be enforced by the mixed integer constraints $$H_i v \leq K_i + M(1-\delta_i), i=1, \ldots, n_p$$

$$\delta_i \in \{0,1\}, i=1, \ldots, n_p, \Sigma_{i=1}^{n_p} \delta_i \geq 1$$

that once embedded in the optimization problem make it mixed-integer.

The mixed integer programs are time consuming to solve and hence can be solved only for very short prediction horizon N. However, if the method of FIG. 11 is used to determine 515, then the set is convex and the problems to be solved are linear or quadratic programming problems, which can be solved very fast even for long horizons N.

Control Using Pre-Existing Control Functions and Control Invariant Sets

Some embodiments are based on a recognition that it is unnecessary to obtain the optimal solution of the linear or quadratic programming problems or the mixed integer linear or quadratic programming problems. Any feasible solution of the problem formulated according the principles of the invention guarantees that all the future constraints are satisfied. This because any future state that is in the invariant set is guaranteed to be feasible and to allow for feasible solutions to be found in the future.

For example, a control input that enforce the system constraints and the tracking performance can be obtained from a set of pre-existing control functions designed without considering the constraints (3) (5), that select the control action u given the state of the machine x and a state of the reference by using the set $C_{x,r,u}$ in Equation (10) as control function selection rule. The examples of the control functions include acceleration and deceleration of the machine.

The example of the control action for a specific control function can include a specific value of the acceleration or deceleration. Similar examples can be made for different machines, where the control functions include increase or decrease of voltage, position, force, etc.

Figure 16A:
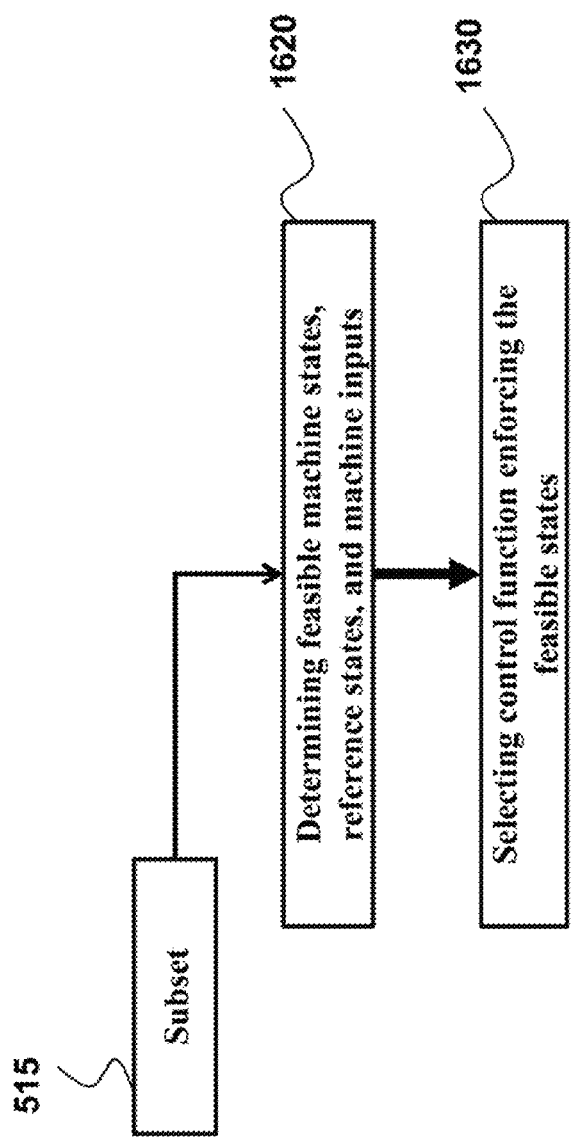

FIG. 16A shows a block diagram of the selection method that uses the control invariant subset according to one embodiment. The embodiment determines 1620 feasible states of the machine, feasible states of the reference trajectory and feasible inputs to the machine, such that is the feasible machine input is applied to the feasible machine state, for all the future reference trajectory states generated by the feasible reference trajectory state and all the admissible reference inputs, the next machine state and reference state remains in the feasible subset 515 which satisfies constraints in Equations (3), (5). Next, the control function generating the control action enforcing that the state of the machine is the feasible state of the machine, the state of the reference trajectory is the feasible state of the reference trajectory, and the input to the machine is the feasible input to the machine is selected 1630.

FIG. 16B shows an example of a method employing the principles of the method of FIG. 16A. Given 1601 the pre-existing control functions and the set $C_{x,r,u}$ at every control cycle 1602 the machine state and reference trajectory state are acquired, a candidate control function is selected 1603, and the candidate control action provided by the candidate control function is evaluated 1604. The control action is verified 1605 by checking whether the current state of the machine, the current state of the reference trajectory and the candidate control action belongs to the set $C_{x,r,u}$. If the verification is positive, the command is applied 1606 to the machine. Otherwise 1607, if there are more candidate control functions to be selected a new candidate control function is selected, or an error is returned 1608.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling an operation of a machine according to a model of a reference trajectory, comprising:
   determining a feasible region for states of the machine and states of the reference trajectory defined by physical constraints of the machine, constraints on a reference trajectory, and constraints on bounds of a tracking error, wherein the feasible region is a time-invariant static region;
   selecting a subset of the feasible region, such that for any state of the machine and any state of the reference trajectory within the subset, there is an admissible control maintaining the state of the machine within the subset for all admissible future states of the reference trajectory determined by the model and the constraints of the reference trajectory;
   selecting an admissible control action for controlling the operation such that the state of the machine remains in the subset for all admissible future states of the reference trajectory; and
   controlling the operation of the machine using the admissible control action, wherein at least some steps of the method are performed using a processor.

2. The method of claim 1, wherein the selecting further comprises:
   testing each state of the feasible region to determine the subset.

3. The method of claim 1, wherein the selecting further comprises:
   partitioning the feasible region into a set of subsets; and
   selecting the subset satisfying a control invariance test.

4. The method of claim 1, wherein the selecting the subset further comprises:
   initializing a current feasible region as the feasible region;
   performing iteratively a backward-reachable region computation until a backward reachable region is equal to the current feasible region, wherein, for each iteration, the backward-reachable region computation removes states with no control that maintains the state of the machine within the current feasible region for the reference trajectories satisfying the constraints on the transient of the reference trajectory.

5. The method of claim 4, wherein the backward-reachable region computation comprises:
   increasing a dimensionality of the current feasible region by combining the feasible region with a set of admissible control actions to produce a higher dimensional region;
   selecting, from the higher dimensional region, combinations of the state of the machine, the state of the reference trajectory and the control action such that the control action maintains the state of the machine within the current feasible region for all the reference trajectories satisfying the constraints on the transient of the reference trajectory; and
   selecting unique pairs of the state of the machine and the state of the reference trajectory, such that at least one machine input exists such that the state of the machine, the state of the reference trajectory and the machine inputs are in the higher dimensional region.

6. The method of claim 4, wherein the backward-reachable region computation comprises:

determining a convex polyhedral invariant subset of a current region;

decoupling checking the constraints of the state of the machine and the constraints on the state of the reference trajectory; and accepting full range of reference input from admissible states of the reference trajectory, regardless whether the next state of the reference trajectory is admissible.

7. The method of claim 1, wherein the selecting the control action comprises:

optimizing a cost function representing the operation of the machine subject to constraints defined by the subset using a model of the machine, a model of the reference trajectory, a current state of the machine, and a current state of the reference trajectory.

8. The method of claim 7, wherein the optimizing is based on future states of the reference trajectory along a prediction horizon, wherein the optimizing comprises:

optimizing the cost function subject to constraints defined by the feasible region for at least a portion of the prediction horizon and subject to constraints defined by the subset of the feasible region at the end of the prediction horizon.

9. The method of claim 7, wherein the optimizing is based on a current reference state and a reference input, wherein the optimizing comprises:

determining states of the reference trajectory along a prediction horizon using the current reference state and the current reference input and constraints on the transient of the reference trajectory, optimizing the cost function subject to constraints defined by the feasible region for a first step of the prediction horizon and constraints of the subset of the feasible region for remaining steps of the prediction horizon.

10. The method of claim 7, wherein the optimizing further comprising:

determining states of the reference trajectory along a prediction horizon using a current reference state and constraints of the transient of the reference trajectory;

determining feasible states of the machine, feasible states of the reference trajectory and feasible inputs to the machine, such that a combination of a feasible state of the machine, a feasible state of the reference trajectory and a feasible input to the machine maintains the state of the machine within the subset of the feasible region; and solving an optimization problem for the prediction horizon enforcing that an input to the machine is the feasible input to the machine corresponding to a current state of the machine and a current state of the reference trajectory.

11. The method of claim 1 wherein selecting the control action comprises:

selecting a control function from a pre-determined group of control functions; and determining the control action according to the control function.

12. The method of claim 11, further comprising:

determining feasible states of the machine, feasible states of the reference trajectory and feasible inputs to the machine, such that a combination of a feasible state of the machine, a feasible state of the reference trajectory and a feasible input to the machine maintains the state of the machine within the subset of the feasible region; and selecting the control function generating a control action that is the feasible input to the machine where the feasible states of the machine and the feasible state of the reference trajectory are a current state of the machine state and a current state of the reference trajectory.

13. A controller for controlling an operation of a machine according to a reference trajectory, comprising:

a memory storing physical constraints of the machine, constraints on the reference trajectory and constraints on bounds of a tracking error of the reference trajectory; and a processor for selecting a control action for controlling the operation such that a state of the machine for all admissible future states of the reference trajectory remains in a subset of the feasible region of states of the machine and states of the reference trajectory and for controlling the operation of the machine using the control action, wherein the feasible region is defined by physical constraints of the machine, constraints on the reference trajectory and constraints on bounds of a tracking error of the reference trajectory, and wherein the subset of the feasible region is a control invariant, such that for any state of the machine within the subset, there is a control maintaining the state of the machine within the subset for all admissible future states of the reference trajectory, and wherein the feasible region is a time-invariant static region.

14. The controller of claim 13, wherein the controlling includes:

determining feasible states of the machine, feasible states of the reference trajectory and feasible inputs to the machine, such that a combination of a feasible state of the machine, a feasible state of the reference trajectory and a feasible input to the machine maintains the state of the machine within the subset of the feasible region; and solving an optimization problem for the prediction horizon enforcing that an input to the machine is the feasible input to the machine corresponding to a current state of the machine and a current state of the reference trajectory.

15. The controller of claim 13, wherein the controlling includes:

determining feasible states of the machine, feasible states of the reference trajectory and feasible inputs to the machine, such that a combination of a feasible state of the machine, a feasible state of the reference trajectory and a feasible input to the machine maintains the state of the machine within the subset of the feasible region; and selecting the control action resulting in the feasible input to the machine from the combination where the feasible states of the machine and the feasible state of the reference trajectory are a current state of the machine state and a current state of the reference trajectory.

16. A non-transitory computer readable storage medium embodied thereon a program executable by a processor for performing a method, the method comprising:

determining a feasible region for states of the machine and states of the reference trajectory defined by physical constraints of the machine, constraints on a reference trajectory and constraints on bounds of a tracking error, wherein the feasible region is a time-invariant static region;

selecting a subset of the feasible region, such that for any state of the machine and any state of the reference trajectory within the subset, there is an admissible control maintaining the state of the machine within the subset for all admissible future states of the reference trajectory determined by the model and the constraints of the reference trajectory;

selecting an admissible control action for controlling the operation such that the state of the machine remains in the subset for all admissible future states of the reference trajectory; and controlling the operation of the machine using the admissible control action.

\* \* \* \* \*